United States Patent
Posner et al.

(10) Patent No.: US 12,012,239 B2
(45) Date of Patent: Jun. 18, 2024

(54) METHOD OF MANUFACTURING A CARTRIDGE FOR A FLUID MIXTURE DISPENSING SYSTEM

(71) Applicant: Palm Mass Customization, LLC, Somerville, MA (US)

(72) Inventors: Nicholas D. Posner, Redwood City, CA (US); Yashodhan Deshpande, Sunnyvale, CA (US)

(73) Assignee: Palm Mass Customization, LLC, Somerville, MA (US)

( * ) Notice: Subject to any disclaimer, the term of this patent is extended or adjusted under 35 U.S.C. 154(b) by 0 days.

(21) Appl. No.: 17/683,736

(22) Filed: Mar. 1, 2022

(65) Prior Publication Data

US 2023/0278737 A1   Sep. 7, 2023

(51) Int. Cl.
    *B65B 29/06*   (2006.01)
    *B65B 1/04*    (2006.01)
    *B65B 57/00*   (2006.01)
    *B67D 1/00*    (2006.01)
    *G06N 3/08*    (2023.01)

(52) U.S. Cl.
    CPC .............. *B65B 29/06* (2013.01); *B65B 1/04* (2013.01); *B65B 57/00* (2013.01); *B67D 1/0078* (2013.01); *G06N 3/08* (2013.01)

(58) Field of Classification Search
    None
    See application file for complete search history.

(56) References Cited

U.S. PATENT DOCUMENTS

| | | | |
|---|---|---|---|
| 4,078,360 | A * | 3/1978 | Balzer ................. B29C 65/7451 53/76 |
| 8,788,090 | B2 | 7/2014 | Rothschild |
| 8,863,649 | B1 | 10/2014 | Rao et al. |
| 9,377,713 | B2 | 6/2016 | Faucher et al. |
| 9,679,329 | B2 | 6/2017 | Jones |
| 10,065,787 | B2 | 9/2018 | Epars et al. |

(Continued)

FOREIGN PATENT DOCUMENTS

| | | |
|---|---|---|
| WO | 2020165774 A1 | 8/2020 |
| WO | 2021240474 A1 | 12/2021 |

OTHER PUBLICATIONS

International Search Report and Written Opinion dated Jun. 6, 2023 from PCT Application No. PCT/US2023/013913, 10 pages.

*Primary Examiner* — Tanzim Imam
(74) *Attorney, Agent, or Firm* — Daylight Law, P.C.

(57) ABSTRACT

Methods for manufacturing cartridges for fluid mixture dispensers are disclosed herein. For example, the cartridges can be ingredient cartridges for fluid mixture dispensers each holding a set of discrete ingredients in a set of ingredient reservoirs. The methods of manufacturing the cartridges can include configuring the cartridges with loadouts including selecting specific ingredients, selecting a number of reservoirs, and selecting a relative size of the various reservoirs. The methods can also include collecting a set of population data using a network of fluid mixture dispensing devices, analyzing the set of population data, and configuring the cartridges so that they are each optimized for a consumption pattern using the set of population data. The methods can further include filling the cartridge reservoirs according to the loadout and packaging the cartridges for shipment.

14 Claims, 8 Drawing Sheets

(56) References Cited

U.S. PATENT DOCUMENTS

| | | |
|---|---|---|
| 10,424,029 B2 | 9/2019 | Singh et al. |
| 2002/0066967 A1 | 6/2002 | Bartsch et al. |
| 2008/0103851 A1 | 5/2008 | Walker et al. |
| 2012/0123588 A1 | 5/2012 | Cloran et al. |
| 2016/0257554 A1 | 9/2016 | Manwani et al. |
| 2019/0232234 A1 | 8/2019 | Rychen |
| 2019/0339006 A1* | 11/2019 | Cronin ..................... A23L 2/52 |
| 2020/0344965 A1 | 11/2020 | Song et al. |

* cited by examiner

METHOD OF MANUFACTURING A CARTRIDGE FOR A FLUID MIXTURE DISPENSING SYSTEM

BACKGROUND

Basic fluid mixture dispensers passively store a premixed fluid which is dispensed out of a reservoir when needed. More sophisticated devices are adapted to create a fluid mixture on demand using a set of base ingredients. For example, a set of concentrated syrups and carbonated water in a soda fountain serves to create a plurality of drinks on demand by mixing the syrup with the carbonated water. Certain fluid dispensers include a library of fluids from which a user can select. Certain fluid dispensers additionally allow a user to customize stored recipes by adding or removing ingredients, adjusting the temperature of the fluid to be dispensed, and making other adjustments.

SUMMARY

This disclosure relates generally to cartridges for fluid mixture dispensing systems, and more specifically, to methods for manufacturing cartridges for fluid mixture dispensing systems. The cartridges associated with this disclosure include a set of individual ingredients which can be used by a fluid mixture dispensing system to create a library of different fluids by mixing the individual ingredients in various ways based on the demands of a given user. As such, it is possible that a consumption pattern applied to the system will not evenly consume all the ingredients in a cartridge. For example, a group of users sharing one device could have an affinity for a specific flavor compound and consume all the cartridge's supply of the ingredients required to produce that flavor compound. At that point, the entire cartridge will need to be replaced to continue to match the desired consumption pattern even if most of the other ingredients in the cartridge have not been fully consumed. The uneven consumption of ingredients due to a lack of alignment between the expected and actual consumption pattern applied to a device can lead to waste and a decrease in the useful life of a cartridge. Although certain cartridges can be recycled and refilled, transporting the cartridge to and from the location at which it is used costs time and energy such that extending the life of the cartridge is important regardless of whether the cartridge is refilled and reused or not.

Methods of manufacturing cartridges are disclosed which configure a cartridge with a loadout that is optimized for a consumption pattern. The process can include analytics conducted on set of data, as harvested by a network of fluid dispensing devices, to determine the loadout. The loadout can be configured based on the data in various ways. For example, the data can represent a consumption pattern for a specific user. In this example, the loadout can be a recommended loadout, selected from a set of template loadouts, that will best fit the consumption pattern for that specific user. Alternatively, the loadout can be a reconfigured loadout which has been customized for the specific user as a best fit for the consumption pattern for that specific user. As another example, the data can represent a consumption pattern for a population of users. In this example, the loadout can be a reconfigured loadout which has been reconfigured to provide a best fit for the consumption pattern for that population of users. The loadouts which have been reconfigured for a population of users in this manner can subsequently be used in a set of template loadouts such as the set of template loadouts mentioned with respect to the previous example.

In specific embodiments of the invention, a method for manufacturing a customized cartridge is provided. The method comprises collecting a set of population consumption data using a network of fluid mixture dispensing devices, collecting a set of user-specific data, generating, using the set of population consumption data and the set of user-specific data, a user-specific predicted consumption pattern, configuring a loadout of ingredients for the customized cartridge to match the user-specific predicted consumption pattern, filling the cartridge with the loadout to generate a filled cartridge, and packaging the filled cartridge.

In specific embodiments of the invention, another method for manufacturing a cartridge is provided. The method comprises collecting a set of population consumption data using a network of fluid mixture dispensing devices, reconfiguring, using the set of population consumption data, a template loadout of ingredients for the cartridge to generate a reconfigured template loadout, filling the cartridge with the reconfigured template loadout to generate a filled cartridge, and packaging the filled cartridge.

In specific embodiments of the invention, a method for manufacturing a cartridge is provided. The method comprises collecting a set of population consumption data using a network of fluid mixture dispensing devices, storing a set of template loadouts, collecting a set of user-specific data for a user, recommending, to the user and using the set of population consumption data and the set of user-specific data, a template loadout from the set of template loadouts, filling the cartridge with the template loadout to generate a filled cartridge, and packaging the filled cartridge.

DETAILED DESCRIPTION

Different systems and methods associated with fluid mixture dispensing system cartridges in accordance with the summary above will be described in detail in this disclosure. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

Figure 1:
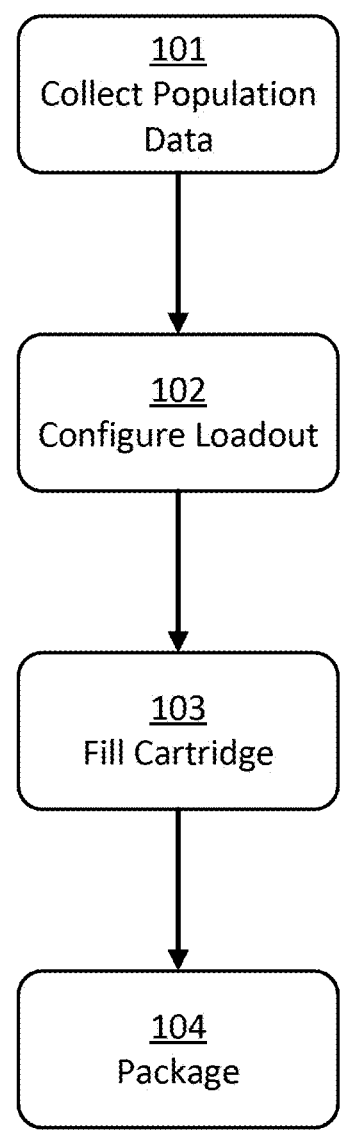
FIG. 1 illustrates a flow chart of a set of methods for manufacturing a cartridge for a fluid mixture dispensing system in accordance with specific embodiments of the invention.

FIG. 1 illustrates a flow chart 100 of a set of methods for manufacturing a cartridge for a fluid mixture dispensing system. The cartridge can store a loadout of ingredients to be used to mix fluids in the fluid mixture dispensing system. The loadout can include a set of ingredients in the form of concentrated liquids. When the cartridge is filled with the ingredients, it can be referred to as a filled cartridge. The filled cartridge can include the set of ingredients in a set of ingredient reservoirs. The ingredient reservoirs can keep the ingredients separate in the cartridge. A single ingredient can be stored in one or more reservoirs. In specific embodiments, the cartridge can include over twenty-five ingredients. The cartridge can be a customized cartridge with a customized loadout for a specific user. The cartridge can be a template cartridge made for a population of users with a template loadout. The cartridge can be a template cartridge made for a specific user who has been matched to the template cartridge. The template cartridge can be selected from a library of template cartridges which each template cartridge made for a separate population of users. In specific embodiments, the template cartridge can include a reconfigured loadout that has been reconfigured to better serve that population of users using data harvested from a network of fluid mixture dispensing devices. Manufacturing the cartridge can include several steps including one or more of: filling the cartridge with a set of ingredients, assigning the ingredients to a specific ingredient reservoir, and altering the size of one or more ingredient reservoirs in the cartridge.

Flow chart 100 includes a step 101 of collecting a set of population consumption data using a network of fluid mixture dispensing devices. The network of fluid mixture dispensing devices can be a network of fluid mixture dispensing devices in accordance with FIG. 6 below or any other network of fluid mixture dispensing devices. The network can have a mesh topology, a star topology, or any other kind of topology. The fluid mixture dispensing devices in the network may be directly linked, or separately linked via a network architecture that administrates the network such as a network architecture in accordance with FIG. 6 below. The population consumption data can be collected by monitoring the number of fluid mixtures dispensed from the device or by monitoring the volume of specific fluid mixtures dispensed from the device. In this example, the population consumption data can include an amount of ingredients in each of the dispensed fluid mixtures to determine how much of each ingredient was consumed. The population consumption data can be collected by directly monitoring, or by indirectly modeling, an amount of each ingredient in the cartridge as it is consumed. The population consumption data can also include a time at which the ingredients or fluid mixtures were dispensed from their reservoirs and may include, in the alternative or in combination, a measurement of the rate at which the ingredients or fluid mixtures were dispensed.

The network of fluid mixture dispensing devices can collect and store additional population consumption data to assist in various analytical approaches disclosed herein. The additional population consumption data can include data correlated with consumption patterns for use in such analytical approaches. For example, the population consumption data can include demographic and geographic information regarding the population itself at the time of consumption. The location of specific devices can be stored in association with data regarding the consumption of ingredients on that device to build a consumption pattern for a specific location or region. As another example, demographic characteristics of the various users such as age and gender can be stored in association with the consumption data to allow for correlations to be discovered and inductive hypotheses to be drawn regarding the consumption pattern of users with overlapping characteristics. As another example, data and characteristics of the environment around various users, such as weather data (like ambient outdoor temperature and precipitation data) or date and time associated with the geographic data at or near the location of the device can be stored in association with the consumption data to allow for correlations to be discovered and inductive hypotheses to be drawn regarding the consumption pattern of users with overlapping characteristics. The population consumption data can be stored and analyzed in an anonymized fashion to allow for analysis of the population data without infringing on the privacy of individual users of the network. The term population consumption data, as used herein, should not be interpreted to include demographic and other such data in the abstract and wholly divorced from consumption of fluid mixture on a device. Demographic data and other such data only constitute population consumption data when they are stored in a meaningful way along with data that directly measures the consumption of ingredients or fluid mixtures.

Flow chart 100 includes a step 102 of configuring a loadout for a cartridge. The cartridge loadout can be configured to reach various objectives in accordance with this disclosure. For example, the cartridge loadout can be configured such that it is a reconfigured template loadout which has been modified to more appropriately meet the consumption patterns of a population or subpopulation of users that utilize a network of fluid mixture dispensing devices. As another example, the cartridge loadout can be configured such that it is a customized cartridge for a specific user. In these examples, the population data can be used to assist in predicting a consumption pattern for the user. This is important in specific embodiments because user data alone will only indicate what a user has done in the past, while combining that information with population data has a better chance of predicting future consumption because future consumption at a given time of year and for a given population with similar characteristics will often correlate more with future consumption by a given user. While this may not hold true for all users, it is expected to increase the accuracy of predicted consumption by a large degree to take population data into account when generating a prediction of consumption for a given user. This is particularly true for newly added users who may have not yet supplied the network with sufficient data to accurately predict their future consumption.

Flow chart 100 further includes steps 103 and 104 of filling a cartridge and packaging the filled cartridge. The cartridge can be filled with the loadout configured in step 102. Filling the cartridge can include depositing ingredients into reservoirs of the cartridge as described below with reference to FIG. 8. Filling the cartridge can also include reconfiguring the reservoirs to make specific subsets larger or smaller relative to the others. Filling the cartridge can also include increasing or decreasing the number of reservoirs to increase or decrease the number of ingredients in the cartridge. Packaging the cartridge can include sealing the reservoirs. The packing can include placing a membrane on the back side of the reservoirs, placing a hard shell over the membrane, sealing the shell to the body of the cartridge, and filling the interior of the resulting sealed cartridge with an inert gas such as Argon.

Different variants of the general method described with reference to FIG. 1 can be conducted in combination or in the alternative. Specific examples of these variants are provided with reference to FIGS. 2-4.

Figure 2:
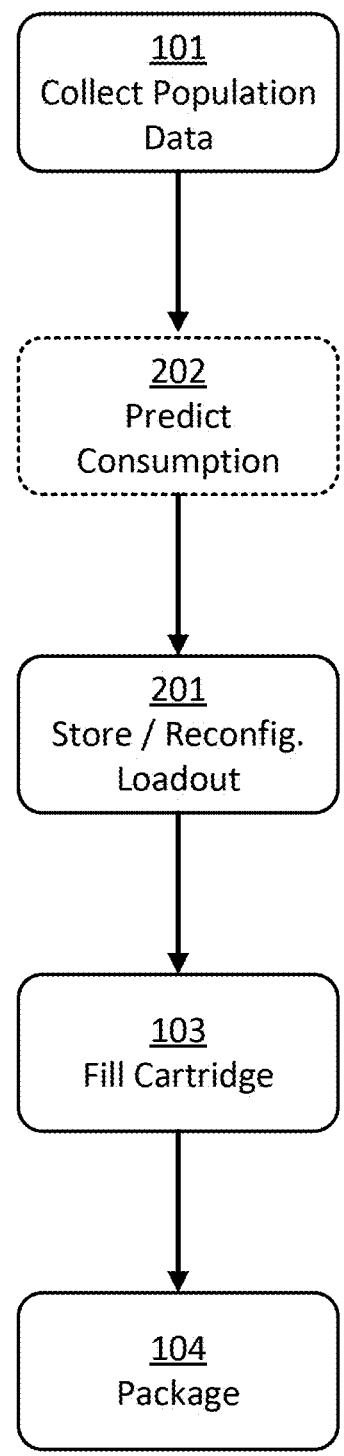
FIG. 2 illustrates a flow chart for a set of methods for manufacturing a template cartridge for a fluid mixture dispensing system in accordance with specific embodiments of the invention.

FIG. 2 illustrates a flow chart 200 for a set of methods for manufacturing a template cartridge for a fluid mixture dispensing system in accordance with specific embodiments of the invention. The cartridges manufactured in accordance with flow chart 200 are template cartridges that are designed to be utilized with a population of users. For example, the template cartridge could be for a class of users that have an affinity for a specific flavor, type of beverage, or for a specific ingredient or set of ingredients. The template cartridges could have a set number of ingredients, a set size and configuration of ingredient reservoirs, and a fixed set of ingredients assigned to specific ingredient reservoirs of that set. The template cartridges could be produced in large numbers along with different alternative template cartridges each targeting different populations. The amount of each template produced could be related to the size of the different populations and their relative consumption patterns. The size of the different populations and their relative consumption patterns could be tracked by a network of fluid mixture dispensing devices. The loadouts for the template cartridges can be configured or reconfigured based on population consumption data collected using a network of fluid mixture dispensing devices. As such, flow chart 200 beings with step 101 of collecting population consumption data using a network of fluid mixture dispensing devices, which can be conducted as described above with reference to FIG. 1.

Flow chart 200 further includes a step 201 of storing one or more template loadouts or reconfiguring one or more template loadouts. These different actions are mapped to the same step in the flow chart because they will both occur at this point depending on the status of the network and the specific flow being executed. For example, a step 201 of storing a set of template loadouts can occur before the loadouts have ever been deployed in cartridges. However, a step 201 of reconfiguring one or more of those stored loadouts can be conducted after the loadouts have been deployed and population consumption data for those loadouts have been collected in an iteration of step 101. The step can include storing or modifying a template among a library of templates that are modified to suit the needs of specific users or subpopulations among the users of a network of fluid mixture dispensing devices. The step can include reconfiguring, using the set of population consumption data obtained in step 101, a template loadout of ingredients for a cartridge to generate a reconfigured template loadout. The template loadout can then be stored in a library of template loadouts.

The template loadouts can be created or reconfigured to increase certain ingredients relative to other ingredients in the cartridge to extend the useful life, on average, of specific instances of the template cartridge that are manufactured for and delivered to specific populations or subpopulations of users. For example, the network may include a "coffee lovers" template cartridge with a loadout intended to serve a consumption pattern that is high in coffee by storing additional caffeine, coffee extract, and phosphoric acid. This configuration could be stored in one iteration of step 201 as a template among a library of templates for specific subpopulations. The step would then involve storing the "coffee lovers" template loadout in a library of template loadouts. In keeping with this example, the same "coffee lovers" template could be reconfigured if a later iteration of step 201 determined that consumption patterns were shifting. For example, the network could determine that the average coffee lover template cartridge user is consuming more hazelnut than what is currently in the template cartridge, such that reconfiguring the loadout in another iteration of step 201 would include increasing the amount of hazelnut stored relative to another ingredient. As such, the second iteration of step 201 could involve storing a reconfigured "coffee lovers" template loadout in the library of template loadouts in place of the template loadout.

The library of templates can be maintained to maximize the useful life of the cartridges, on average, for all of the users of a network of fluid mixture dispensing devices, and to reach other objectives. For example, the library of templates can be maintained to assure a long average useful life for the users of the cartridges, while maintaining a minimum per-user expected average useful life. In the alternative of in combination, the library of templates can be maintained to assure a long average useful life for the users of the cartridges, while limiting the number of entries in the library to assist in the logistical burdens associated with manufacturing, storing, and delivering a large number of diverse products. The template loadouts can be reconfigured with these objectives in mind. Additionally, the library can be contracted or expanded with these objectives in mind. For example, if a single template is not adequately serving the consumption pattern of two diverging subpopulations that have been assigned to a template cartridge, a new template cartridge can be added to the library to serve one of the subpopulations. In the same manner, templates can be merged and assigned to a combined group of subpopulations if the consumption patterns of those subpopulations merge. As such, the storing or reconfiguring of a template in the library in step 201 can include assigning a subpopulation of users to the template loadout, and the flow chart can finish with a step of delivering a cartridge manufactured with that template loadout to a user in the subpopulation.

The templates can be configured and reconfigured based on various factors. For example, the templates can first be configured using marketing surveys, customer onboarding surveys and/or user research surveys to determine the consumption patterns of various users. The surveys could identify the consumption patterns of specific users who would tend to identify as belonging to a subpopulation associated with a given template (e.g., a survey question could ask the same questions that would be used to onboard users to the system and initially assign them to a such as "Are you a coffee lover?" or "Do you prefer coffee or tea?"). As anther example, the templates can be configured and reconfigured using the population data collected in step 101. The templates can be reconfigured to better meet an average expected population consumption pattern for a population of users assigned to the template.

The templates can be configured and reconfigured based on population consumption data. The population consumption pattern can be obtained from marketing surveys or user research surveys or through harvesting information from a network of fluid mixture dispensing devices. The population consumption data can be used to predict or derive an average population consumption pattern. The consumption pattern can be predicted using any of the approaches disclosed herein regarding predicting consumption for the purpose of configuring or reconfiguring loadouts. The loadouts can be reconfigured to better serve the average consumption pattern. For example, step 201 can include reconfiguring, using the set of population consumption data collected in step 101, a template loadout of ingredients for a cartridge to generate a reconfigured template loadout. The templates can be configured or reconfigured using an optional step 202 of generating a predicted consumption pattern using the set of population consumption data. The predicted consumption pattern can be generated using a neural network or a statistical analysis as described elsewhere herein. The prediction can be generated by finding correlations between user-specific consumption data and population consumption data. The predicted consumption pattern can be an average consumption pattern that represents the average consumption pattern of the users in a population. The template loadout could then be reconfigured by adding, removing, or updating ingredient volumes in the cartridge in proportion to the rate the ingredients are consumed in the population consumption pattern.

Flow chart 200 concludes with steps 103 of filling the cartridge with the reconfigured template loadout or original template loadout to generate a filled cartridge and step 104 of packaging the filled cartridge. The cartridge can then be sent to a specific user or stored for delivery to a user with a consumption pattern that can be best served by the template. The user can be a user from a subpopulation that has been assigned to the template. In some cases, the changes to the template may lead to a decrease in the useful life of the cartridge to a particular user in the population. However, the templates could still be reconfigured regardless in order to meet demand for the various users in the population in the aggregate. In specific embodiments of the invention, users may be recommended to alternative templates or be given an entirely customized cartridge if their consumption pattern begins to deviate too far from the average of the population that utilizes the same cartridge. Furthermore, the configuration and reconfiguration of specific cartridge loadouts could be connected to a process of creating entirely new templates to service subpopulations of users. The combined process of creating and eliminating templates, changing template loadouts, and monitoring population consumption data could include a dynamic system in which potential waste and cartridge useful life are target variables to be minimized across the population subject to any constraints associated with cost effectively manufacturing, storing, and tracking, many different customized cartridges efficiently.

Figure 3:
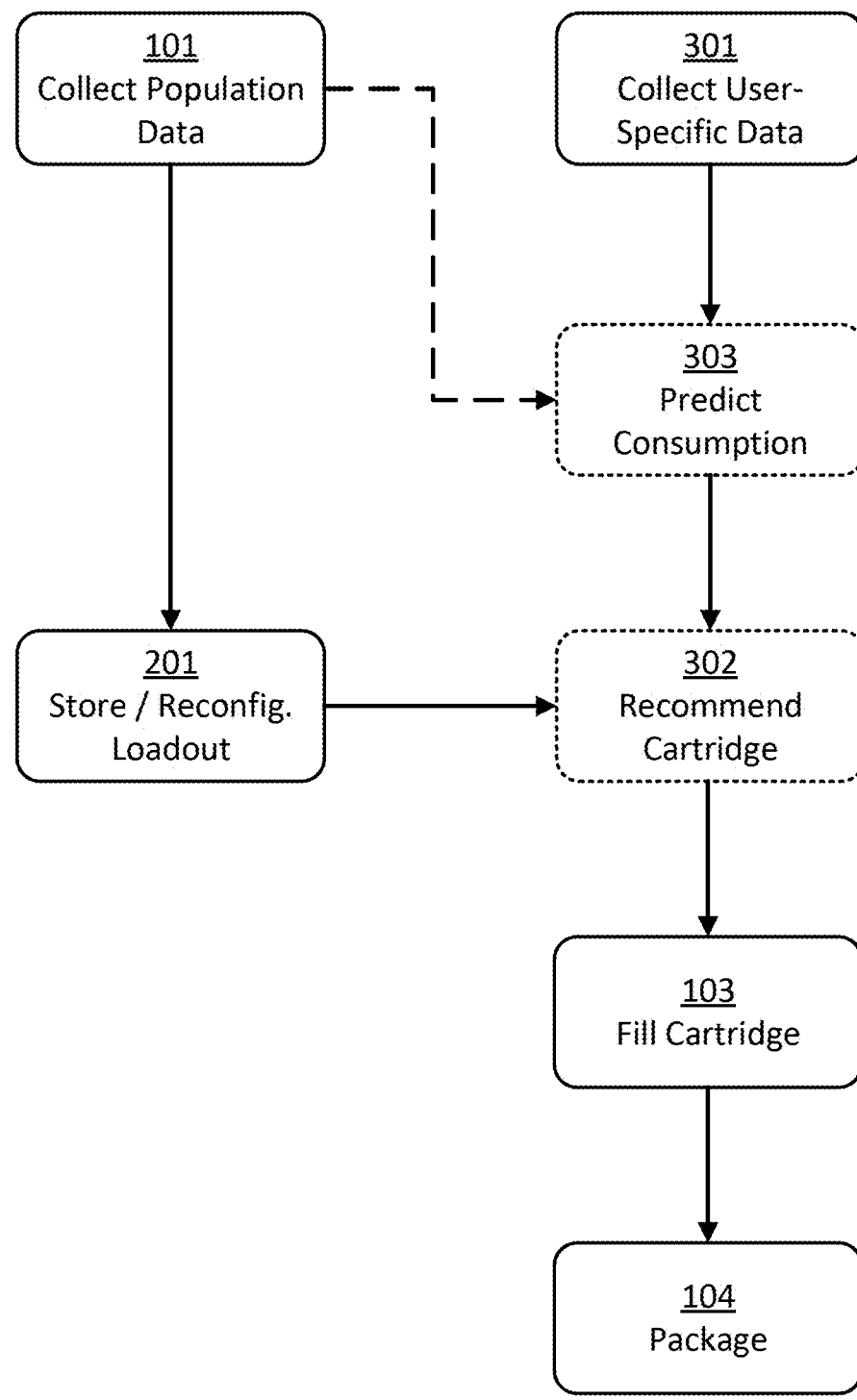
FIG. 3 illustrates a flow chart for a set of methods for manufacturing a template cartridge for a specific user of the fluid mixture dispensing system in accordance with specific embodiments of the invention.

FIG. 3 illustrates a flow chart 300 for a set of methods for manufacturing a template cartridge for a specific user of the fluid mixture dispensing system in accordance with specific embodiments of the invention. Flow chart 300 includes many of the same steps as in flow chart 100 and flow chart 200, and like steps are marked using the same reference numbers to indicate steps that can be conducted in accordance with those corresponding steps from the other flow charts. Flow chart 300 includes the steps leading to the step 201 of storing or reconfiguring a set of template cartridges in a library of templates. Flow chart 300 additionally includes a step 301 of collecting a set of user-specific data for a user. This data can then be used, in a step 302, to recommend a template loadout to the user. Step 302 can include recommending a template loadout from the set of template loadouts using both the user-specific data collected in step 301 and the population data collected in step 101.

In flow chart 300, step 302 of recommending a cartridge to the user is illustrated as an optional step because a recommended cartridge may be filled and packaged for a user without making an explicit recommendation to the user. In specific embodiments, an interface of the fluid mixture dispensing system, such as an integrated display on a fluid mixture dispensing device, or a smartphone or other external device that is communicatively connected to and forms a part of the fluid mixture dispensing system, will display a recommendation to the user for a cartridge with a title and/or graphic of the cartridge displayed (e.g., a recommendation for a cartridge with the tile "Hard Seltzer Cartridge" will be displayed with an accompanying graphic). The user can then accept the recommendation and initiate an order for a cartridge or decline the recommendation and be offered an alternative cartridge or a default selection cartridge or their previous cartridge selection. However, in alternative embodiments, the fluid mixture dispensing system will not make an explicit recommendation to a user and will instead automatically match the user to a template cartridge that the system determines will best meet the consumption pattern of the user. The system will then automatically fill and package the cartridge for the user. In these embodiments, the user may still need to approve the order, approve of using an automatic cartridge matching algorithm, or approve of a recurring subscription to refill cartridges before those steps are taken.

The user-specific data collected in step 301 can be collected in various ways and can include various types of data. For example, step 301 could include an onboarding process for a new user with a questionnaire embedded in the onboarding process to ask the user about their demographic information, flavor preferences, beverage preferences, lifestyle, and any other information that is correlated with the number and types of fluids a user consumes through the course of a day. The questionnaire could additionally ask the user to directly identify beverages, beverage variations, flavors and/or other similar information that they enjoy and estimate how many of such beverages the user drinks in a given day and ask the user to directly identify beverages, beverage categories, or flavors that they would never consume. In specific embodiments of the invention in which multiple users will share a single cartridge, such as in the case of a family household or office setting, the collection of user-specific data in step 301 could be repeated multiple times to produce a combined consumption profile for that group of users. As another example, step 301 could include the fluid mixture dispensing system directly tracking the consumption of various beverages and ingredients by the user during their daily usage of the system as with the population consumption data mentioned above. In general, the collection of user-specific data in step 301 can use similar techniques to the collection of population consumption data described with reference to step 101.

The user-specific consumption data collected in step 301 can include data that is correlated to consumption as with the population consumption data collected in step 101. For example, the user-specific consumption data could be stored in association with user profile information, a user location, the weather in the location the device is located, the time of year and time of day of consumption, and other data such as the amount of advertising dollars spent in a given region to promote a particular beverage or class of beverages. Any data that provides useful insights and context into the user's consumption of specific ingredients could be harvested and stored in this manner.

The collection of user-specific data could also include identifying certain events that will dramatically alter the consumption pattern, such as hosting a house party, going on vacation, or having an extended house guest. Again, these events could be directly identified by the user entering them into a user interface of the fluid mixture dispensing system, or they could be gleaned indirectly through other sources. For example, if the fluid mixture dispensing system had access to the location data of a smartphone of the user, it could determine that the user was on vacation, and could ignore the temporary dip in consumption. In these approaches, template cartridges could also initially be assigned to users using a questionnaire that would ask the users similar questions to that of the survey.

A specific template cartridge can be recommended for a user in step 302, or selected for the user transparently, in various ways. The specific template can be recommended using an optional step 303 of generating a user-specific predicted consumption pattern for the user. The consumption pattern can be conducted in accordance with the approaches described with reference to step 202 in FIG. 2 with the exception that the consumption pattern is being predicted for a specific user. The step can utilize both user-specific data collected in step 301 and population consumption data collected in step 101. The appropriate template can be recommended in step 302 to best meet the predicted consumption pattern. As such, recommending the template loadout in step 302 can include selecting the template loadout from a set of template loadouts using the user-specific predicted consumption pattern generated in step 303. For example, the system can review a rate of consumption of all the ingredients in the predicted consumption pattern, assure that each of the ingredients is present in the template cartridge, and assure that the volume of the ingredients is present in the cartridge in proportion to the predicted rate of consumption. In alternative approaches, a consumption pattern does not need to be predicted. Instead, the user-specific consumption data of the user can be directly compared to those of specific populations for which a template cartridge has been designed. This analysis can determine which specific population has, on average, the most similar characteristics to the user in terms of consumption data. The system can then assign the template cartridge designed for that population to the user.

Flow chart 300 concludes with steps 103 of filling the cartridge with the template loadout to generate a filled cartridge and step 104 of packaging the filled cartridge. The cartridge can then be sent to a specific user for whom the cartridge was recommended. The cartridges can be manufactured on demand as the user accepts the recommendation for the cartridge. However, in alternative approaches, the cartridges for a specific user can be prepared before the user requires them by collecting user-specific consumption data and anticipating a time at which the user's current cartridge will run out.

Figure 4:
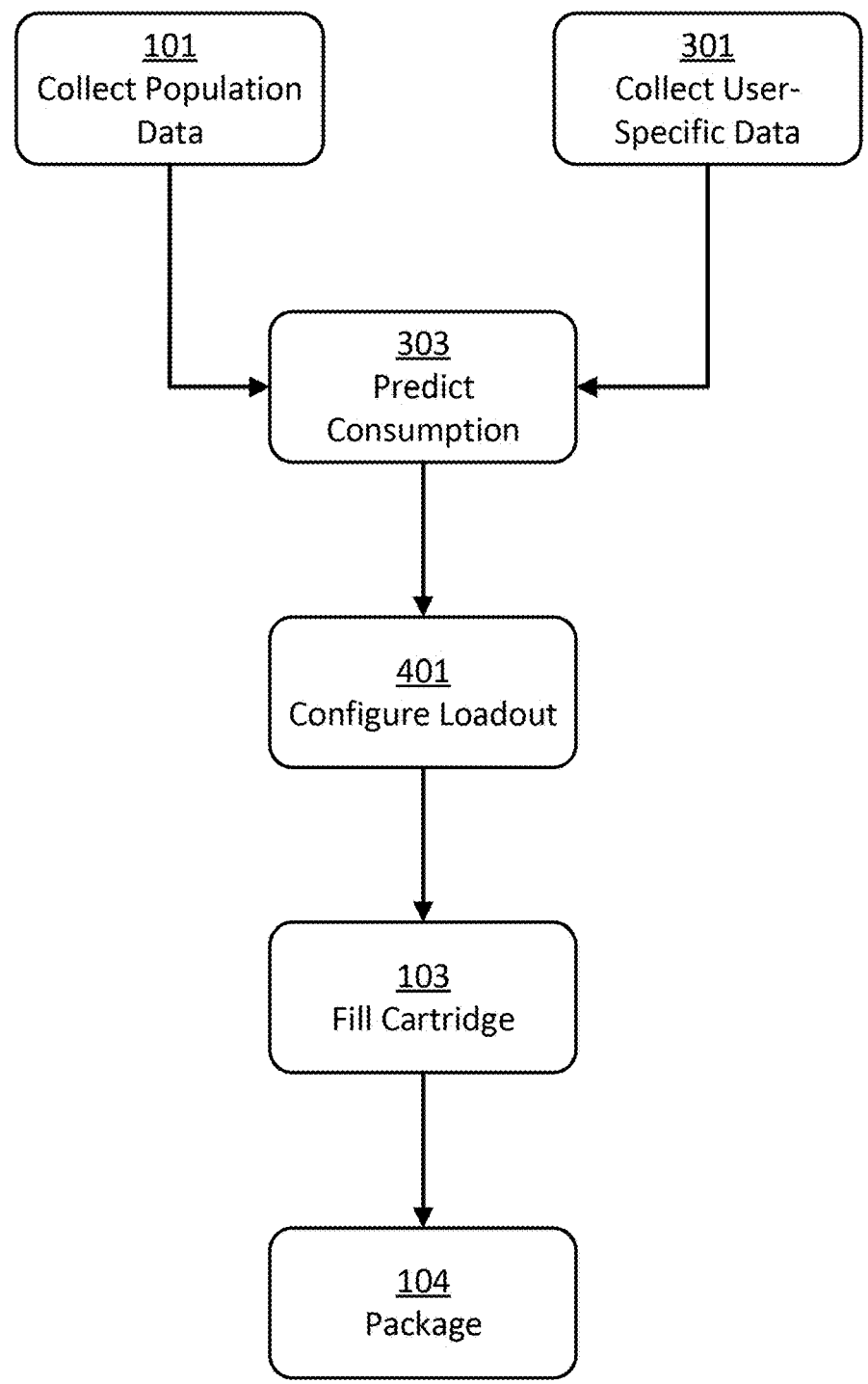
FIG. 4 illustrates a flow chart for a set of methods for manufacturing a customized cartridge for a specific user of the fluid mixture dispensing system in accordance with specific embodiments of the invention.

FIG. 4 illustrates a flow chart 400 for a set of methods for manufacturing a customized cartridge for a specific user of the fluid mixture dispensing system in accordance with specific embodiments of the invention. Flow chart 400 includes many of the steps in previous figures and similar steps are labeled with similar reference numbers. In particular, flow chart 400 includes a step 301 of collecting a set of user-specific data and a step 303 of generating, using a set of population consumption data and the set of user-specific data, a user-specific predicted consumption pattern. Flow chart 400 then continues with a step 401 of configuring a loadout of ingredients for the customized cartridge to match the user-specific predicted consumption pattern. The step can be conducted in a similar fashion to specific implementations of selecting a template cartridge to best fit a consumption pattern for a user. However, there is no need to solve for the best fit as the cartridge can be configurable to give a fully customized amount of ingredients to the user. For example, the consumption pattern could include a list of ingredients and a rate at which the ingredients were consumed, and the cartridge could be configured to house a volume of each of those ingredients in proportion to the predicted rate of consumption. A buffer volume could be added to specific ingredients, and additional ingredients could be added, in case of deviations in the expected consumption pattern. In specific embodiments in which the reservoirs of the cartridge are only adjustable to a fixed set of sizes, the system could include reservoirs that were larger than the predicted consumption pattern would seem to require. This would effectively round up the amount of certain ingredients to serve as a buffer volume and accommodate the lack of full flexibility of the reservoir sizes.

Flow chart 400 concludes with steps 103 of filling the cartridge with the customized loadout to generate a filled cartridge and step 104 of packaging the filled cartridge. The cartridge can then be sent to a specific user for whom the cartridge was recommended. The cartridges can be manufactured on demand as the custom cartridge is recommended to the user. However, in alternative approaches, the customized cartridges for a specific user can be prepared before the user requires them by collecting user-specific consumption data and anticipating a time at which the user's current cartridge will run out. Similar to the approach in flow chart 300, flow chart 400 could alternatively include a step of recommending the customized cartridge to the user. However, this is not an essential step as the cartridge could be automatically manufactured and delivered to the user. The user may be required to approve this transaction or subscribe to an automatic fulfillment service prior to commencing manufacturing. The recommendation or automatic fulfillment of the cartridge could be conducted based on a prediction of when the user's current cartridge will be depleted (e.g., prior to when the cartridge was predicted to run out, another cartridge could be recommended, or automatically manufactured, and delivered). The same methods used to predict a consumption pattern could make this prediction based on knowledge of the current level of ingredients in the cartridge.

Figure 5:
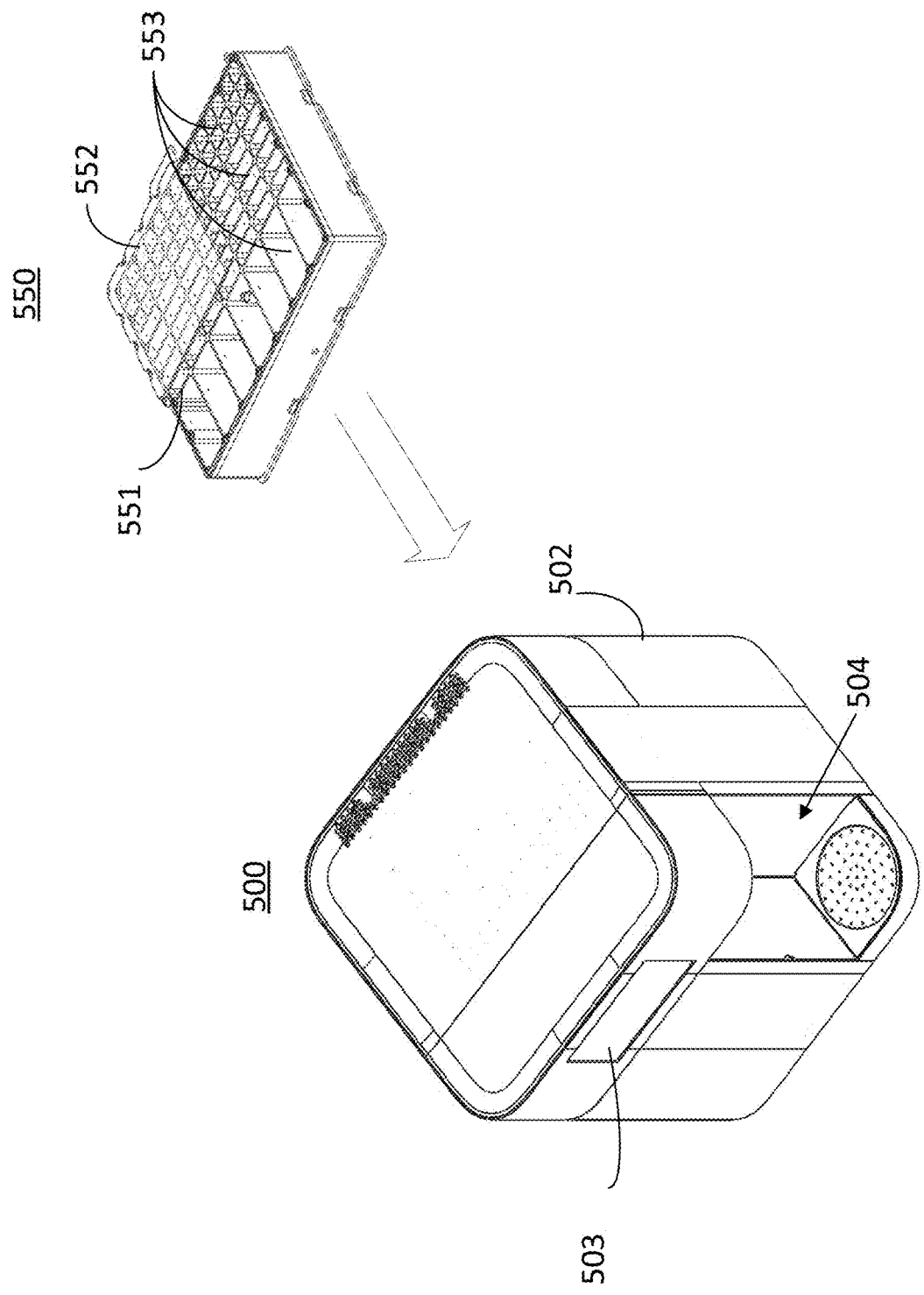
FIG. 5 illustrates a fluid mixture dispensing device and an accompanying cartridge that can be manufactured in accordance with specific embodiments of the invention.

FIG. 5 illustrates a fluid mixture dispensing device 500 and an accompanying cartridge 550 that can be manufactured in accordance with specific embodiments of the invention. The fluid mixture dispensing device 500 can exhibit the characteristics of any of the fluid mixture dispensing devices described in U.S. Provisional Patent Application No. 63/146,461 filed Feb. 5, 2021, and U.S. patent application Ser. No. 17/547,081 filed Dec. 9, 2021, both of which are incorporated by reference herein in their entirety for all purposes.

The fluid mixture dispensing device 500 can include a casing, such as casing 502, that can house various internal components of the device. The internal components can include any of the components described for any of the devices in in U.S. Provisional Patent Application No. 63/146,461 filed Feb. 5, 2021, and U.S. patent application Ser. No. 17/547,081 filed Dec. 9, 2021. For example, the internal components can include one or more ingredient reservoirs. The ingredient reservoirs can be any of the ingredient reservoirs described in U.S. Provisional Patent Application No. 63/146,461 filed Feb. 5, 2021, U.S. patent application Ser. No. 17/547,081 filed Dec. 9, 2021, and U.S. patent application Ser. No. 17/545,699 filed Dec. 8, 2021, all of which are incorporated by reference herein in their entirety for all purposes. As another example, the internal components can include one or more cartridges for the ingredient reservoirs. The cartridges can be any of the cartridges described in U.S. Provisional Patent Application No. 63/146,461 filed Feb. 5, 2021, U.S. patent application Ser. No. 17/547,081 filed Dec. 9, 2021, U.S. patent application Ser. No. 17/545,699 filed Dec. 8, 2021, and U.S. patent application Ser. No. 17/547,612 filed Dec. 10, 2021, all of which are incorporated by reference herein in their entirety for all purposes. As another example, the internal components can include one or more solvent reservoirs. The solvent reservoirs can be any of the solvent reservoirs described in U.S. Provisional Patent Application No. 63/146,461 filed Feb. 5, 2021, and U.S. patent application Ser. No. 17/547,081 filed Dec. 9, 2021.

A fluid mixture dispensing device such as device 500 can therefore be adapted to mix a fluid mixture using one or more ingredients from the ingredient reservoirs and/or one or more solvents from the solvent reservoirs. The fluids can be synthesized based on recipes for the fluids. The recipes can be in a library of recipes from which a user can select. The recipes can include the amount of ingredient and other data required for the specific fluids, such as the temperature of the fluids, a mixing time, etc. The recipe can be compatible with the fluid mixture dispensing device in that the device can be able to mix the fluids from the recipe. For example, the recipe can be in the form of instructions for a controller in the device 500 or be otherwise translated into instructions for the device. The controller can execute the instructions and actuate corresponding valves, pumps, and other components to dispense the required amounts of ingredient(s) and/or solvent(s) for the beverage. The valves, pumps and other components can be actuated for a period of time determined by the amount of ingredient to be dispensed. In this way, the recipe can be in terms of the ingredients and amount of ingredients or in terms of actuation of mechanical components, such as which valves to open and for how long. The recipe can be in any other terms as long as it is compatible with the device and the device can therefore mix a fluid from it.

The fluid mixture dispensing device can include a user interface, such as user interface 503. The user interface 503 can include any means for outputting information from the device to a user of the device, and for inputting information from the user of the device to the device. In this way, the user interface can include any means that facilitate the interaction of a user of the device with the device, including but not limited to a display, a speaker, a microphone, a camera, various sensors such as light and presence sensors, etc. For example, the user interface can include a touch screen display, so that the device can display information for the user via the display, and the user can provide inputs to the device via the touch screen display. As another example, the interaction between the user and the device can be via auditory cues provided by the device via a speaker and voice commands from the user received via a microphone. As another example, the device can recognize user facial expressions and gestures via cameras and sensors. The user interface components can be associated to the controller of the device so that the controller can administrate the information to be outputted and process the information being received. The user interface can be used by the user for many actions, such as for selecting a fluid from the library of recipes to be mixed and dispensed out of the device, for example, to a dispense area 504 where a vessel or other container can be placed to receive the fluid.

FIG. 5 also includes a cut away view of cartridge 550 which can be inserted into fluid mixture dispensing device 500. The ingredients can then be dispensed from the cartridge 550 in various amounts and mixed with solvents in fluid mixture dispensing device 500 in order to mix various fluids for dispensing into dispense area 504. The cartridge includes a membrane 552 which seals a common volume 551 which is shared by a set of ingredient reservoirs 553. The ingredient reservoirs 553 store discrete ingredients for use by fluid mixture dispensing device 500. The ingredients can be stored as concentrated liquids and be dispensed in minute volumes, on the order of microliters per beverage or less, in order to mix various fluids. The illustrated ingredient reservoirs have three different sizes (from the front of the cartridge to the back) to store different volumes of specific ingredients. The cartridge can be manufactured modularly in accordance with specific embodiments of this disclosure such that there are more ingredient reservoirs, different sized ingredient reservoirs, and different ingredients assigned to specific ingredient reservoirs. Individual ingredients can be assigned to one or more ingredient reservoirs and to ingredient reservoirs of one or more sizes.

Figure 6:
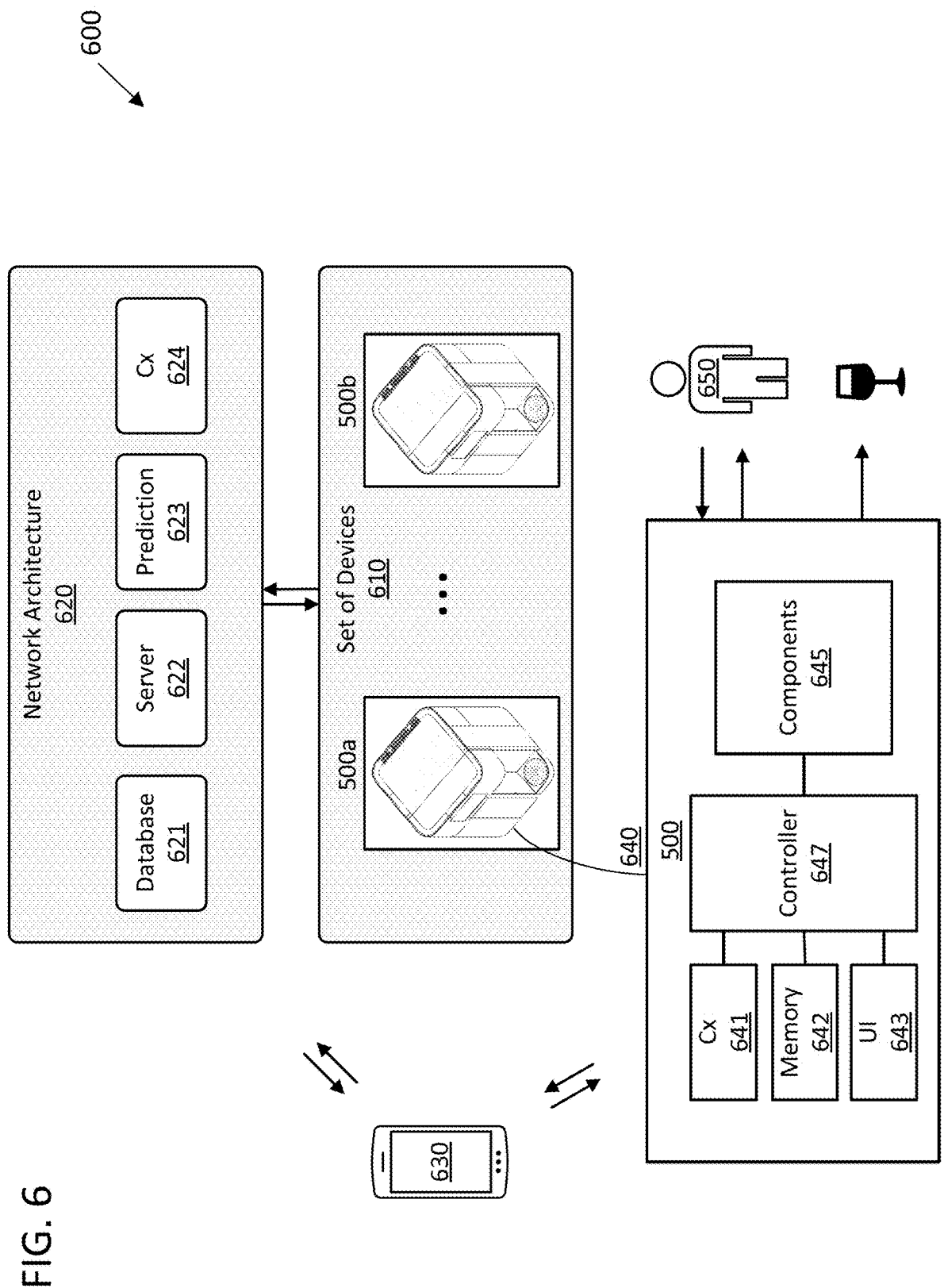
FIG. 6 illustrates a block diagram of a network of fluid mixture dispensing devices in accordance with specific embodiments of the invention.

A fluid mixture dispensing device such as fluid mixture dispensing device 500 can be part of a network of devices which can comprise any number of devices. The network of devices can be part of or be associated to a platform that can be configured to harvest information from the network of devices and use such information to administrate the manufacturing, storage, and distribution of cartridges for the devices in the network. FIG. 6 illustrates a block diagram of a network of fluid mixture dispensing devices in accordance with specific embodiments of the invention. The network of fluid mixture dispensing devices is an example of the kinds of networks of device that are mentioned throughout this disclosure.

As illustrated in FIG. 6, the network 600 includes or is associated to a set of networked devices 610. The set of networked devices 610 can include multiple devices such as device 500 (exemplary devices 500a and 500b in the example of FIG. 6 will collectively be referred to as devices 500, and the ellipsis in the middle represents that any other number of devices can be included). The set of networked devices 610 can be a distributed network. Devices 500 in the set of networked devices 610 can be in geographically different locations and belong to completely different entities (e.g., different users or companies). The devices 500 can be able to communicate through the network 600 (e.g., with other devices in the network) via communications means as will be described below in more detail. The devices 500 can also be able to communicate with other network entities (e.g., with a network architecture 620, the Internet, user devices such as user device 630, and/or other devices out of the network 600) via communications means as will be described below in more detail.

FIG. 6 includes a block diagram 640 of exemplary components of a beverage synthesis device such as device 500. As mentioned before, device 500 can include communications means, such as one or more communication modules 641. The communication means (or communication modules 641) can include any means for transmitting and any means for receiving data. For example, the communication means can include one or more means for wirelessly transmitting and receiving data, such as data transmitted via electromagnetic waves (e.g., radio frequency (RF) signals). This can include any means for wireless communications known to a person skilled in the art of wireless communications, such as but not limited to a wireless receiver, a wireless transmitter and or a wireless transceiver. More specific components can include one or more antennas, one or more codecs, one or more digital to analog (D/A) and/or analog to digital (A/D) converters, one or more data modulators, etc. The communication modules such as communication module 641 can be embedded communication modules of a dedicated technology, such as a Bluetooth module, a WiFi module, a Zigbee module, an RFID module, a cellular communications module, etc. As another example, the communication means can include one or more means for non-wireless data communications. For example, the device can include a wired connection to the Internet, or to a device that provides connection to and/or out of the network 600, such as a modem. The communication means can include one or more ports and/or connections in the device 500 such as USB ports, Ethernet ports, etc., for this purpose, and/or that can be directly used to exchange data (e.g., by plugging an Ethernet cable directly to device 500, or a USB WiFi adapter to provide the device with network connection and/or access to the Internet).

The one or more communication modules 641 can allow the devices in network 600 to communicate (e.g., transmit and/or receive data). The one or more communication modules 641 can allow the devices in network 600 to communicate with each other, either directly or through a dedicated network or through a public or private network, such as the Internet or a cellular network. The devices can also communicate, via the one or more communication modules 641, with a network architecture, such as network architecture 620. In specific embodiments of the invention, the devices can communicate with each other through the network architecture 620 itself, as will be explained below in more detail. The devices can also communicate, via the one or more communication modules 641, with devices which are not part of the network 600, such as a user device 630. The devices can communicate with such device via Bluetooth, WiFi, or any of the technologies described above, or any other technology such as short-range communications (e.g., Near Field Communications (NFC)).

As illustrated in network 600, the one or more communication modules can be connected by one or more controllers of the device, such as controller 647. In this way, the controller can administrate the data received and/or transmitted via the communication modules 641. The controller can operate in association with one or more memories, such as memory 642. The one or more memories can store instructions to be executed by the one or more controllers 647 so that the controller 647 can perform tasks for the device 500, such as administrating the data received and/or transmitted via communication modules 641. For example, the controller 647 can pull data from memory 642 to be sent to the user device 630, the network architecture 620, and/or another device 500 via the one or more communication modules 641. Similarly, the controller can store received data in memory 642. The controller can additionally or in combination periodically send data or prepare data on the fly for transmission via communication modules 641, such as by using data in memory and/or data entered (via the user interface 643, user device 630, etc.) to compute data to be sent out of the devices 500. The controller can also administer the information to be outputted and/or inputted via the user interface 643 (introduced with reference to FIG. 5). The controller can also be in communication with and/or control other components 645 of the device. The components 645 can be any other components of the device, for example, the electronic, electric, and/or mechanical components that enable the device 500 to synthesize and dispense a beverage. The components 645 can include sensors, valves, pumps, and subsystems of the device such as a pneumatic system, a dispense system, a cleaning system, etc. The components 645 can be any of the components of any of the fluid mixture dispensing devices described in U.S. Provisional Patent Application No. 63/146,461 filed Feb. 5, 2021, and U.S. patent application Ser. No. 17/547,081 filed Dec. 9, 2021.

Each of the devices 500 in network 600 can be equipped to perform its functions (e.g., synthesize and dispense a fluid) individually without being connected to the network architecture 620. For example, the devices can include a library of recipes stored locally in memory for a set of fluids to be synthesized by the device (e.g., how much of each ingredient should be mixed together for a given fluid, what is the temperature of the fluid, etc.). Each device can likewise include instructions stored in memory for the device to synthesize and dispense such recipes (e.g., which valves to open and how much time should they be open for the ingredients to be dispensed according to the recipe, etc.). A user of the device, such as user 650, can operate the device via the user interface 643 and/or a user device 630 (e.g., to select the recipes, to personalize such recipes, to program the device, etc.) and the device 500 can be able to conduct such functions by executing instructions in memory. In this way, each of the devices 500 in network 600 can be administered individually (for example, a user of each device can administrate the device via the user interface 643 or a user device, such as user device 630) regardless of any access to network architecture 620.

In specific embodiments of the invention, however, it can be advantageous to provide a device which can operate in association with a network architecture, such as network architecture 620, from both a user perspective and a device manufacturer perspective. Network 600 can include or be associated with additional resources that can make the experience of using devices 500 richer and more appealing to the users, while at the same time contributing to an organic development of the platform and overall improvement of the features offered.

Network architecture 620 can include resources (e.g., hardware and/or software) that can augment the functionalities of the platform and/or the devices 500 in network 600. In specific embodiments of the invention, the network architecture 620 can administrate one or more functions for the devices 500. For example, network architecture 620 can administrate communication among set of devices 610, can store data for the network of devices (for example, user data, recipes, current ingredient levels of the various cartridges of the devices, numbers and types of beverages dispensed by each of the devices over time and since the last cartridge was replaced, instructions to be executed by the devices, etc.), can provide system's updates, can run sanity checks for the devices, can connect the devices to other systems and/or services such as repair systems, ingredients supply systems, cleaning systems, etc.

The network architecture 620 can be a physical network architecture, a virtual network architecture, or a combination of both. In specific embodiment of the invention, the network architecture 620 is a cloud network architecture. The network architecture can be proprietary to the network 600 or be implemented in a public network such as a cloud computing provider's hosting service or any other service. The network architecture 620 can include any number of resources to enable various functionalities to the platform. For example, the network architecture can include storage and processing power for the network of devices, as will be explained below in more detail.

In specific embodiments of the invention, the network architecture 620 can include the communication channels and resources that enable communication between the set of devices 610 and/or with the network architecture 620, such as routers, getaways, etc. In specific embodiments of the invention, the network resources (hardware and/or required software to interconnect the devices 500) in set of devices 610 is provided by the network architecture 620 itself, and the set of devices 610 can be part of the network architecture 620.

The network architecture can include one or more databases, such as database 621. The databases can store any kind of data associated to the network 600. The databases can provide storage for the set of devices 610. For example, database 621 can be a user's data database and store information about the users of the devices 500, such as user profiles, user preferences, user platform history, fluids consumed using the current cartridge, current ingredient levels of the various cartridges, a predicted consumption pattern for a user, subpopulation, or population of users associated with set of devices 610, user payment history, etc. The database 621 can be a recipes database, and store recipes to be accessed by set of devices 610, such as one or more library of recipes. The database 621 can be an instructions database, and store instructions to be executed by the network of devices to perform certain functions. The database 621 can be a system's database and store data related to the system's operational parameters, updates, and performance.

The network architecture can include one or more servers, such as server 622. The servers can run any kind of services for the network 600. For example, the servers can administrate communication between the devices in set of devices 610 and/or with the rest of network architecture 620. The servers can provide an interface between the set of devices 610 and the rest of the resources in network architecture 620, such as an interface between the set of devices 610 and database 621. The servers can also provide interfaces between the network 600 and external platforms or services. For example, the servers can implement Application Programming Interfaces (API) to pull data from other platforms, such as external weather databases or marketing data platforms (e.g., weather data can be pulled and stored with associated consumption data and marketing data platforms can be accessed to pull data required to predict future consumption).

The network architecture 620 can instantiate one or more services for the set of devices 610, such as a prediction engine 623. The prediction engine can be instantiated by a server, such as server 622, or be a different hardware module with processing elements and access to data to conduct these functions. The prediction engine 623 can use data harvested by the network architecture from set of devices 610 and optionally additional external sources, to create consumption predictions for individual users, subpopulations of users, and populations of users. Prediction engine 623 can include a statistical analysis and prediction model for generating a prediction based on previously collected consumption data stored in database 621. Prediction engine 623 can include trained artificial intelligence systems which have been trained using prior consumption data (including correlated demographic data) from database 621 and that take in data from set of devices 610 and other external sources (e.g., an artificial neural network can implement an analysis of historical data and currently obtained data correlated with consumption using one or more of a linear regression, support vector regression, random forest, decision tree, or k-nearest neighbor analysis).

The network architecture 620 can also include communication means such as means for transmitting and means for receiving data. The means can include one or more communication modules, such as communication module 624. Communication module 624 can be the same or similar to communication modules 641. The communication modules can serve to communicate with the set of devices 610, to communicate different resources within the network architecture itself, and/or to allow communication with other devices and systems. In specific embodiments of the invention, the means for transmitting and the means for receiving information include one or more servers to which the devices 500 have access, and the transmitting and receiving take place by accessing the server(s). In this way, the network architecture can be said to be transmitting information when the devices are accessing information therefrom, and receiving information, when the devices are sending information thereto. A user device, such as user device 630, can be able to communicate with the network architecture via the communication means 624, and therefore transmit data to and receive data from both the network architecture and the device 500.

In specific embodiments of the invention, the network 600 can include or otherwise be associated with the set of devices (e.g., set of devices 610) and the network architecture (e.g., 620) to administrate functions of the platform. As explained before in this disclosure, the set of devices 610 can be a distributed network. The network architecture can likewise be a distributed network architecture. The network 600 can likewise be a distributed network or platform. The various resources can be administered by centralized and/or distributed controllers so that the network performs the various functions smoothly regardless of the distribution of resources necessary for the given function. In specific embodiments of the invention, the network can include a hierarchy of controllers so that various resources can be controlled separately and still respond to a higher-level set of controllers.

In specific embodiments of the invention, the network can be used for distributing and collecting information to and from the network of devices. For example, the network can be used to allow the devices in the network to share content. For example, data from one device (e.g., user data, personalization of a recipe, a recipe created by one user) can be made accessible to other devices in the network by either accessing this data directly through the network of devices or though the network architecture. In specific embodiments of the invention, the network can collect and distribute all the information required to implement the methods disclosed herein, such as collecting information from the devices about a number of liquids dispensed or an amount of specific ingredients dispensed from a given cartridge. The devices can also transmit a notification when a new cartridge has been installed so that the network architecture is aware that the ingredients have been refreshed. The notification can include an identification of the cartridge or a description of the loadout of the cartridge. In specific embodiments of the invention, the network architecture can store a set of manifests in association with cartridge identifiers that describe how much of and what ingredients are stored in each cartridge. As such, the network architecture can determine, from a cartridge identifier received from a device, how much of the various ingredients are on each device. The information described in this paragraph can be used by any combination of the network architecture and the set of devices in the network to allow the network architecture to maintain a model of the cartridges of the various devices in order to monitor consumption and monitor when the cartridges are expected to run out so that a replacement cartridge can be manufactured and shipped to the users of the devices.

In specific embodiments of the invention, network 600 can administrate any of the methods described with reference to FIGS. 1-4 and any of the methods disclosed herein. In specific embodiments of the invention, the methods are performed using a network of devices which include more than one device (e.g., at least two devices and up to any number of devices in the network of devices).

Figure 7:
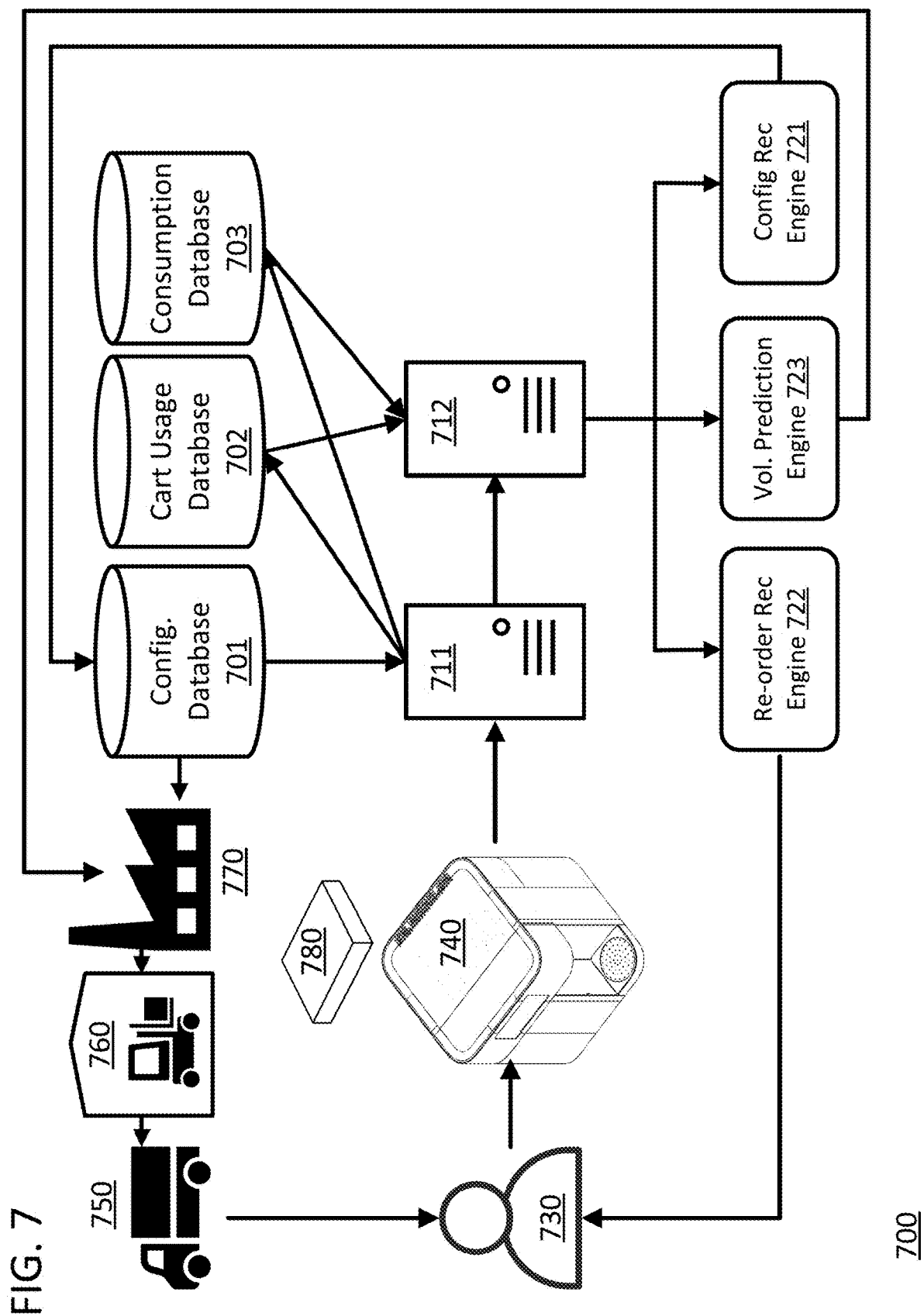
FIG. 7 illustrates a block diagram of the interaction of a fluid mixture dispensing device with a manufacturing and distribution system via a network architecture in accordance with specific embodiments of the invention.

FIG. 7 illustrates a block diagram 700 of the interaction of a fluid mixture dispensing device with a manufacturing and distribution system via a network architecture in accordance with specific embodiments of the invention. Block diagram 700 includes a network architecture with a configuration database 701, a cartridge usage database 702, and a consumption database 703. The network architecture also includes a cloud services server 711 and an analytics services server 712 that provide various services to the system as described below. Block diagram 700 also illustrates a user 730 which represents the physical location of a user at which a delivery system 750 can provide cartridges, such as a cartridge 780, and a user interface to which services of the analytics services server 712 can provide information. The system of block diagram 700 seeks to recommend and provide cartridges, such as cartridge 780, to user 730 to be used in device 740 in such a manner as to extend the useful life of the cartridges delivered to the user, to assure that cartridges are ready for delivery to user 730 when the prior cartridge is depleted, and to minimize logistical and manufacturing constraints on storage system 760 and factory 770.

The cloud services server 711 conducts multiple actions on behalf of the system and provides various services. The configuration database 701 can store a set of loadouts for the various cartridges used with the system along with an identification number for the cartridges that have that loadout. The device 740 can communicate with cloud services server 711 of the network architecture by issuing various event notifications. The device 740 can interrogate a radio frequency identification number, or other automated identification system, on cartridge 780 to obtain an identification of the cartridge as it is installed. The installation of the cartridge can be sent as one of these event notifications, along with the identification of the cartridge, to cloud services server 711. The configuration database 701 can then be accessed by cloud services server 711 to obtain the loadout for cartridge 780 in exchange for the identification of the cartridge. Configuration database 701 can include both the types and amounts of ingredients stored in the cartridges as well as the size and number of ingredient reservoirs in the cartridges. Cloud services server 711 can then create an entry in cartridge usage database 702 which stores the status of the various deployed cartridges in the system. The status of the cartridges can be updated each time a device 740 sends an event notification to cloud services server 711 with the identification of a recipe, or an explicit description of an amount of an ingredient, that was used by device 740 in the dispensing of a fluid. Cloud services server 711 can then update the model of the cartridge's state in cartridge usage database 702. At the same time, cloud services server 711 can update a consumption database 703 with user-specific data regarding the consumption of the beverage. The information provided from cloud services server 711 to consumption database 703 could also include additional information correlated to consumption along with the information about specific beverages being poured or ingredients being used. For example, cloud services server 711 could provide information regarding the location in which the liquid was mixed, demographic information regarding the user, and various other consumption information.

The analytics services server 712 likewise conducts multiple actions on behalf of the system and provides various services. The analytics services server 712 can receive information from the cartridge usage database 702 and the consumption database 703 to generate the analytics processes described throughout this disclosure. The analytics services server 712 can also receive commands from cloud services server 711 to conduct these analyses and provide various services to the other components of the system. For example, the analytics services server 712 can predict consumption patterns for specific users or populations in order to reconfigure template cartridge loadouts or customized cartridge loadouts stored in configuration database 701. These services are represented by configuration reconfiguration engine 721. As another example, the analytics services server 712 can use similar consumption prediction methods, used to determine an optimal cartridge loadout for maximizing a useful life of a cartridge, to instead make a prediction as to when a current cartridge would be depleted. This information could then be sent to factory 770 to trigger the production of a replacement cartridge for a user. These services are represented by volume prediction engine 723. As another example, the analytics services server 712 can conduct analytics regarding either a consumption prediction or a direct evaluation of the characteristics of a user with the characteristics of a subpopulation of the system to recommend a cartridge to a user. In the case of a replacement cartridge, rather than an initial cartridge, these services could also be tied to a prediction of when the cartridge is going to run out to make the recommendation to the user at the appropriate time. If the recommendation is met with approval, a new cartridge can be made for the user using factory 770 or selected and shipped to the user from a set of template cartridges stored in storage system 760. In alternative embodiments, the recommendation can be replaced by the automatic reordering of a replacement cartridge. In particular, if the volume prediction engine is working in the aggregate across several users that will be recommended the same template cartridge, factory 770 could be instructed to make a replacement for a proportion of the depleting cartridges with the expectation that a certain percentage of the depleting cartridges will be replaced with the cartridges to be recommended by the system. These services are represented by reorder recommendation engine 722 which can, in specific embodiments that are not illustrated, connect to factory 770.

While not illustrated, in specific embodiments of the invention the consumption database 703 can also be updated based on information obtained at factory 770 or storage system 760. In these embodiments, returned cartridges that are being cleaned and refilled can be evaluated to determine if the model of the cartridge in cartridge usage database 702 was correct, or if errors occurred in determining the amount of each ingredient consumed. This harvested information can then be used to update the manner in which consumption of the ingredients is modeled in the cartridge usage database 702 and to update the consumption database 703 to reflect actual consumption of ingredients more accurately in the cartridge while the cartridge is deployed. For example, modeling of ingredient loss owing to other factors than the ingredients being dispensed into fluids, or modeling of ingredient loss or surplus owing to inaccurate dispensing of the ingredients relative to the recipes of the fluids could be included in the modeled cartridge usages and consumption data.

Figure 8:
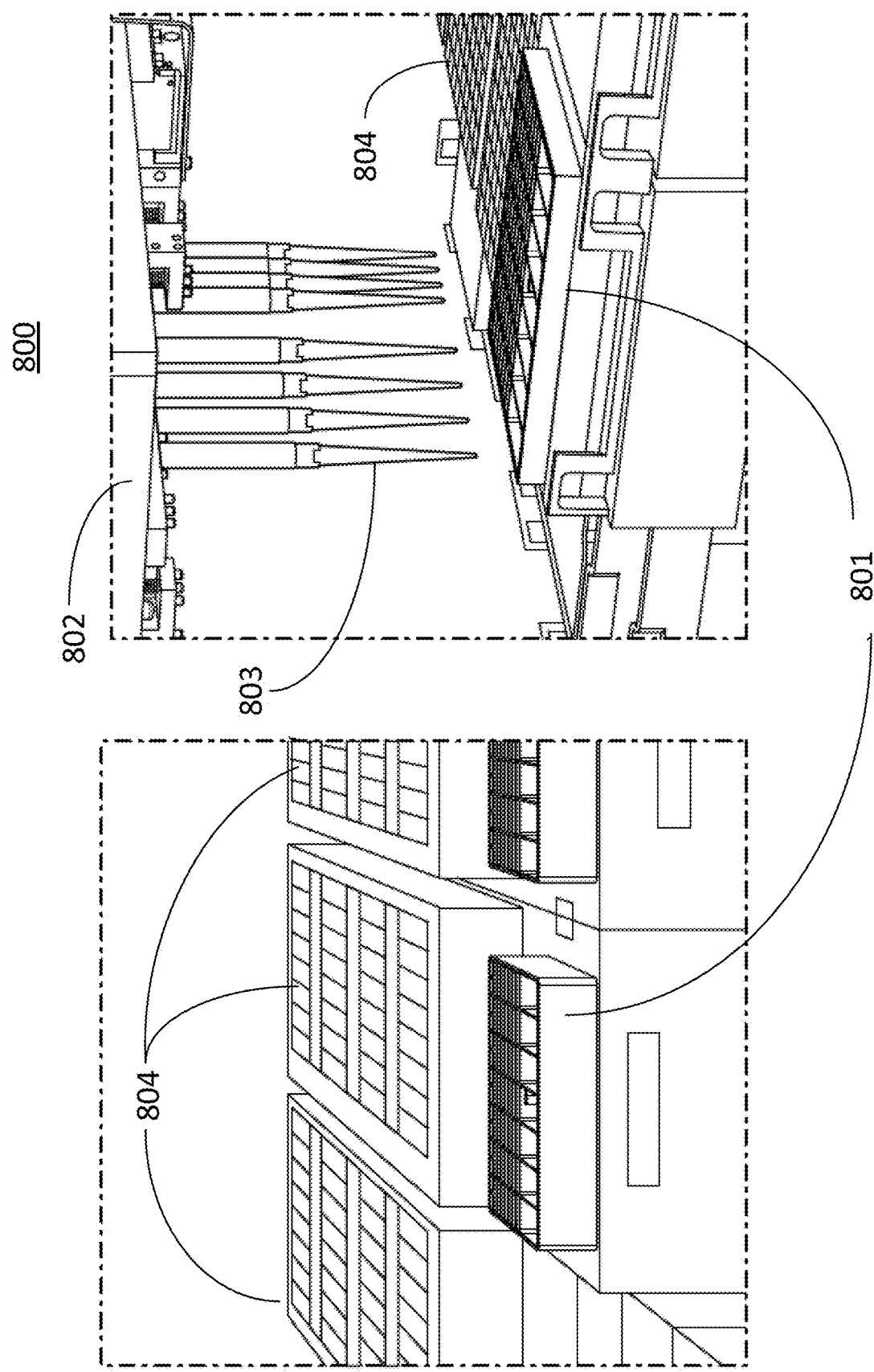
FIG. 8 illustrates a process for filling a cartridge with a loadout in accordance with specific embodiments of the invention.

FIG. 8 illustrates a mechanism 800 for filling a cartridge 801 with a loadout in accordance with specific embodiments of the invention. The mechanism 800 includes a gantry 802 with a set of pipettes 803 that can be inserted into various ingredient source wells 804 and used to transport precise amounts of specific ingredients to cartridge 801. The number of pipettes 803 can be set to the number of unique ingredients in the source wells to avoid cross contamination between fills. In specific embodiments of the invention, this will require a set of greater than one hundred individual pipettes. The source wells 804 could include an active and standby set of all ingredients with the set of pipettes being configured to alternatively switch between sourcing from active and standby wells for a given ingredient to assure that the standby ingredients can be swapped out and refilled while the mechanism continues to fill new cartridges.

The consumption predictions used to predict when a cartridge will be consumed, or to match a user to a cartridge to maximize the useful life of the cartridge, can be conducted in various ways. In specific embodiments of the invention, consumption prediction of the various ingredients can be generated by a neural network. The neural network can be trained using consumption data obtained using the network. As such, the neural network can be continually trained as the network of devices are used to create fluid mixtures. The consumption predictions can be used to predict the consumption of a specific user, an average user amongst a subpopulation of users that are associated with a given template cartridge, or an average user amongst a population generally. The networks can be trained using population consumption data and user-specific consumption data. The input to the networks can, in accordance with standard neural network principles, be the same types of data. For example, generating a user-specific consumption pattern as a prediction can include applying user-specific consumption data from a prior cartridge as an input to the neural network.

In specific embodiments of the invention, the neural network can be a long short-term memory (LSTM) network used to predict the next consumption pattern of a user given the past "n" consumption patterns of the user. In these embodiments, the consumption patterns can be the rate at which specific ingredients were consumed during use of the last cartridge given to the user. The inputs will then be numerical rates for "x" ingredients available to be used in the cartridges with a rate of zero assigned to ingredients that were not used at all by the user regardless of whether the ingredient was in the cartridge or not. In embodiments in which cartridges are allowed to be used after certain ingredients are fully depleted, with a limited library of fluid mixtures that it can dispense, the rate of consumption can be measured for the ingredients that ran out first by ignoring the time after the ingredient was depleted. In specific embodiments of the invention, the inputs to the LSTM network can also include demographic information of the user provided alongside the past "n" consumption patterns. In an alternative approach, the last "n" consumption patterns can be specific to a time of year instead of specific to a cartridge. For example, the last "n" consumption patterns could be for the last 12 months with the rate of consumption for the various ingredients derived across the usage of multiple ingredient cartridge. The output of the network could then be a predicted rate of consumption for the various ingredients in the system for the user's next cartridge or fixed period of time.

In alternative embodiments of the invention, the neural network can be a standard fully connected neural network with the inputs to the network being the last consumption pattern of use. The consumption pattern could be the rate at which the ingredients were used in the last cartridge or in a last fixed period of time. The input could also include additional information such as the current time of year and demographic information concerning the user. The outputs from the network could then be predicted rates of consumption of the various ingredients available to the system with a value of zero indicating that the ingredient would not be consumed at all.

In specific embodiments of the invention, the system can include multiple neural networks that have been optimized for specific populations. A specific user can then be matched to the population using an evaluation of their demographic or consumption information, and the optimized neural network for that population can then be used to conduct a consumption prediction for that user.

As used in this disclosure, a controller with reference to controller 647, for example, can include one or more processors that can be distributed locally within the system or remotely. For example, one or more components of the system, such as valves, pumps, and sensors can be associated to individual microcontrollers that can control their operations and interaction with other components of the system. In specific embodiments of the invention, the controller can be a control system for the overall device even if the various control elements are separately programmed and are not part of a common control hierarchy. The controller can have access to one or more memories that store the instructions for the controllers. The memories can also store information for the system, such as a library of recipes, consumption data, cartridge identifiers, and all other related data mentioned in this disclosure. Any of the methods disclosed herein can be executed by a processor in combination with a computer readable media storing instructions for the methods in combination with the other hardware elements described above.

While the specification has been described in detail with respect to specific embodiments of the invention, it will be appreciated that those skilled in the art, upon attaining an understanding of the foregoing, may readily conceive of alterations to, variations of, and equivalents to these embodiments. For example, while the example of a fluid mixture dispensing system in the form of a beverage dispenser has been used throughout this disclosure, the approaches disclosed herein are more broadly applicable to any fluid mixture dispensing device with cartridges that contain a set of ingredients. Furthermore, the approaches disclosed herein are not limited to fluid mixture dispenses using fluid ingredients as inputs, as they are more broadly applicable to fluid, gaseous, or solid matter synthesis systems and to devices operating with feed materials in the form of liquid, gaseous, solid, or mixed phase ingredients. These and other modifications and variations to the present invention may be practiced by those skilled in the art, without departing from the scope of the present invention, which is more particularly set forth in the appended claims.

What is claimed is:

1. A method for manufacturing a customized cartridge, comprising:
   collecting a set of population consumption data using a network of fluid mixture dispensing devices;
   collecting a set of user-specific data;
   generating, using the set of population consumption data and the set of user-specific data, a user-specific predicted consumption pattern;
   configuring a loadout of ingredients for the customized cartridge to match the user-specific predicted consumption pattern;
   filling the customized cartridge with the loadout to generate a filled cartridge; and
   packaging the filled cartridge;
   wherein: (i) the loadout includes a set of ingredients in the form of concentrated liquids; and (ii) the filled cartridge includes the set of ingredients in a set of ingredient reservoirs.

2. The method of claim 1, wherein:
   collecting the set of user-specific data includes collecting a user-specific consumption pattern using the network of fluid mixture dispensing devices.

3. The method of claim 1, wherein:
   collecting the set of user-specific data includes collecting information using a wizard presented on a user interface.

4. The method of claim 1, wherein:
   generating the user-specific predicted consumption pattern using the set of population consumption data includes conducting a statistical analysis on the set of population consumption data; and
   generating the user-specific predicted consumption pattern using the set of user-specific data includes finding correlations between the set of user-specific data and the set of population consumption data.

5. The method of claim 1, wherein:
   generating the user-specific predicted consumption pattern using the set of population consumption data includes training a neural network using the set of population consumption data; and
   generating the user-specific predicted consumption pattern using the set of user-specific data includes applying the set of user-specific data to the neural network as an input to the neural network.

6. The method of claim 1, wherein:
   configuring the loadout of ingredients for the customized cartridge to match the user-specific predicted consumption pattern includes adding ingredients to the customized cartridge in proportion to a rate the ingredients are consumed in the user-specific predicted consumption pattern.

7. The method of claim 1, further comprising:
   recommending the customized cartridge on a user interface.

8. The method of claim 7, further comprising:
   generating a prediction for when a currently installed cartridge will be depleted; and
   recommending the customized cartridge on the user interface based on the prediction.

9. The method of claim 1, further comprising:
   generating a prediction for when a currently installed cartridge will be depleted; and
   packaging the filled cartridge based on the prediction.

10. A method for manufacturing a customized cartridge, comprising:
    collecting a set of population consumption data using a network of fluid mixture dispensing devices;
    collecting a set of user-specific data;
    generating, using the set of population consumption data and the set of user-specific data, a user-specific predicted consumption pattern;
    configuring, a loadout of ingredients for the customized cartridge to match the user-specific predicted consumption pattern;
    filling the customized cartridge with the loadout to generate a filled cartridge; and
    packaging the filled cartridge;
    wherein configuring the loadout of ingredients for the customized cartridge to match the user specific predicted consumption pattern includes adding ingredients to the customized cartridge in proportion to a rate the ingredients are consumed in the user-specific predicted consumption pattern.

11. The method of claim 10, wherein:
    the loadout includes a set of ingredients in the form of concentrated liquids; and
    the filled cartridge includes the set of ingredients in a set of ingredient reservoirs.

12. A method for manufacturing a customized cartridge, comprising:
    collecting a set of population consumption data using a network of fluid mixture dispensing devices;
    collecting a set of user-specific data;
    generating, using the set of population consumption data and the set of user-specific data, a user-specific predicted consumption pattern;
    configuring a loadout of ingredients for the customized cartridge to match the user-specific predicted consumption pattern;
    generating a prediction for when a currently installed cartridge will be depleted;
    recommending the customized cartridge on a user interface based on the prediction;
    filling the customized cartridge with the loadout to generate a filled cartridge; and
    packaging the filled cartridge.

13. The method of claim 12, wherein:
    the loadout includes a set of ingredients in the form of concentrated liquids; and
    the filled cartridge includes the set of ingredients in a set of ingredient reservoirs.

14. A method for manufacturing a customized cartridge, comprising:
    collecting a set of population consumption data using a network of fluid mixture dispensing devices;
    collecting a set of user-specific data;
    generating, using the set of population consumption data and the set of user-specific data, a user-specific predicted consumption pattern;
    configuring a loadout of ingredients for the customized cartridge to match the user-specific predicted consumption pattern;
    filling the customized cartridge with the loadout to generate a filled cartridge;
    generating a prediction for when a currently installed cartridge will be depleted; and
    packaging the filled cartridge based on the prediction.

* * * * *